US010098088B1

(12) United States Patent
Kumar et al.

(10) Patent No.: US 10,098,088 B1
(45) Date of Patent: Oct. 9, 2018

(54) SYSTEM AND METHOD FOR SELECTING A TRANSCEIVER FOR PERFORMING A POSITIONING REFERENCE SIGNAL MEASUREMENT

(71) Applicant: QUALCOMM Incorporated, San Diego, CA (US)

(72) Inventors: Akash Kumar, Hyderabad (IN); Amit Jain, San Diego, CA (US); Ankita, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/841,273

(22) Filed: Dec. 13, 2017

(51) Int. Cl.
*H04M 1/00* (2006.01)
*H04W 64/00* (2009.01)
*H04B 15/00* (2006.01)

(52) U.S. Cl.
CPC .......... *H04W 64/006* (2013.01); *H04B 15/00* (2013.01)

(58) Field of Classification Search
CPC ..... H04W 16/12; H04W 16/02; H04W 16/24; H04W 28/16; H04W 16/32; H04W 72/04; H04W 76/02; H04W 16/10; H04W 16/14; H04W 24/00; H04W 28/04; H04W 28/18
USPC .......... 455/447–453, 456.1–456.2, 464, 513, 455/522, 63.1, 553.1
See application file for complete search history.

(56) References Cited

U.S. PATENT DOCUMENTS

| | | | |
|---|---|---|---|
| 9,543,994 B1 | 1/2017 | Kose et al. | |
| 9,794,856 B2* | 10/2017 | Cheng | H04W 48/02 |
| 2010/0317343 A1 | 12/2010 | Krishnamurthy et al. | |
| 2012/0083278 A1* | 4/2012 | Kazmi | H04W 36/06 455/440 |
| 2013/0147732 A1* | 6/2013 | Peterson | G06F 3/0416 345/173 |
| 2014/0218240 A1* | 8/2014 | Kpodzo | G01S 19/21 342/450 |
| 2015/0087338 A1* | 3/2015 | Kazmi | H04W 64/00 455/456.1 |

(Continued)

*Primary Examiner* — Dai A Phuong
(74) *Attorney, Agent, or Firm* — MG-IP Law, P.C.

(57) ABSTRACT

Systems and methods are disclosed for improving Positioning Reference Signaling (PRS) measurements. A method comprises receiving an instruction at a user equipment (UE) to perform a PRS measurement on a target band, wherein the PRS measurement is an inter-frequency PRS measurement associated with a PRS measurement occasion, estimating, for each transceiver of a plurality of transceivers associated with the UE, and based on one or more transmit frequency bands thereof, interference with the inter-frequency PRS measurement, identifying a primary aggressor transceiver from among the plurality of transceivers, wherein the primary aggressor transceiver has a highest estimated interference, identifying an uplink transmission window associated with the primary aggressor transceiver, comparing the uplink transmission window to the PRS measurement occasion, selecting the identified primary aggressor transceiver as a selected transceiver in response to a determination that there is complete overlap between the uplink transmission window and the PRS measurement occasion, tuning the selected transceiver to the target band, and performing the inter-frequency PRS measurement with the selected transceiver.

30 Claims, 7 Drawing Sheets

(56) References Cited

U.S. PATENT DOCUMENTS

| | | | |
|---|---|---|---|
| 2015/0296359 A1* | 10/2015 | Edge | H04W 4/22 |
| | | | 455/404.2 |
| 2016/0156424 A1 | 6/2016 | Mirbagheri et al. | |
| 2016/0234707 A1 | 8/2016 | Kazmi et al. | |
| 2016/0234709 A1 | 8/2016 | Fischer | |
| 2016/0309468 A1* | 10/2016 | Chen | H04W 4/70 |
| 2017/0134128 A1* | 5/2017 | Opshaug | H04W 64/00 |
| 2017/0223492 A1* | 8/2017 | Bitra | H04W 4/90 |
| 2017/0230839 A1* | 8/2017 | Cui | H04W 16/14 |
| 2017/0230986 A1* | 8/2017 | Moon | H04W 74/08 |
| 2018/0049152 A1* | 2/2018 | Xiao | H04W 4/02 |

* cited by examiner

SYSTEM AND METHOD FOR SELECTING A TRANSCEIVER FOR PERFORMING A POSITIONING REFERENCE SIGNAL MEASUREMENT

Aspects of this disclosure relate generally to telecommunications, and more particularly to Positioning Reference Signal (PRS) measurements performed by a user equipment (UE) having multiple transceivers.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long-Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In some implementations of the aforementioned wireless communication systems, a UE may be instructed to perform PRS measurements at a target frequency (or band). The instruction may be received from a base station and/or a location server. The UE may perform the instructed PRS measurement and report back to the base station and/or the location server. The base station and/or the location server may be configured to use the PRS measurement report to improve the functioning of the UE itself and/or the functioning of the wireless communication system as a whole.

Many conventional UEs have multiple transceivers. A problem in multiple-transceivers UEs is that uplink transmissions transmitted using one transceiver may interfere with downlink transmissions (such as PRS measurements) received by one or more other transceivers. As a result, the UE may be unable to sense its position, or may be unable to sense its position with sufficient precision.

New systems and methods are needed for mitigating downlink interference with one transceiver caused by uplink transmission by another transceiver.

SUMMARY

The following summary is an overview provided solely to aid in the description of various aspects of the disclosure and is provided solely for illustration of the aspects and not limitation thereof.

In one example, a method for improving Positioning Reference Signal (PRS) measurements is disclosed. The method may include, for example, receiving an instruction at a user equipment (UE) to perform a PRS measurement on a target band, wherein the PRS measurement is an inter-frequency PRS measurement associated with a PRS measurement occasion, estimating, for each transceiver of a plurality of transceivers associated with the UE, and based on one or more transmit frequency bands thereof, interference with the inter-frequency PRS measurement, identifying a primary aggressor transceiver from among the plurality of transceivers, wherein the primary aggressor transceiver has a highest estimated interference, identifying an uplink transmission window associated with the primary aggressor transceiver, comparing the uplink transmission window to the PRS measurement occasion, selecting the identified primary aggressor transceiver as a selected transceiver in response to a determination that there is complete overlap between the uplink transmission window and the PRS measurement occasion, tuning the selected transceiver to the target band, and performing the inter-frequency PRS measurement with the selected transceiver.

In another example, a user equipment (UE) is disclosed. The UE may include, for example, a plurality of transceivers, wherein at least one of the plurality of transceivers is configured to receive an instruction to perform a PRS measurement on a target band, wherein the PRS measurement is an inter-frequency PRS measurement associated with a PRS measurement occasion, and a selected transceiver of the plurality of transceivers is configured to perform an inter-frequency PRS measurement, memory configured to store data, instructions, or a combination thereof, and a processing system, coupled to the memory and the plurality of transceivers, that is configured to estimate, for each transceiver of a plurality of transceivers associated with the UE, and based on one or more transmit frequency bands thereof, an interference with the inter-frequency PRS measurement, identify a primary aggressor transceiver from among the plurality of transceivers, wherein the primary aggressor transceiver has a highest estimated interference, identify an uplink transmission window associated with the primary aggressor transceiver, compare the uplink transmission window to the PRS measurement occasion, select the identified primary aggressor transceiver as the selected transceiver in response to a determination that there is complete overlap between the uplink transmission window and the PRS measurement occasion, and tune the selected transceiver to the target band.

In yet another example, an apparatus is disclosed. The apparatus may include, for example, means for receiving an instruction to perform a PRS measurement on a target band, wherein the PRS measurement is an inter-frequency PRS measurement associated with a PRS measurement occasion, means for estimating, for each transceiver of a plurality of transceivers associated with a UE, and based on one or more transmit frequency bands thereof, an interference with the inter-frequency PRS measurement, means for identifying a primary aggressor transceiver from among the plurality of transceivers, wherein the primary aggressor transceiver has a highest estimated interference, means for identifying an uplink transmission window associated with the primary aggressor transceiver, means for comparing the uplink transmission window to the PRS measurement occasion, means for selecting the identified primary aggressor transceiver as a selected transceiver in response to a determination that there is complete overlap between the uplink transmission window and the PRS measurement occasion, means for tuning the selected transceiver to the target band, and means for performing the inter-frequency PRS measurement with the selected transceiver.

In yet another example, a non-transitory computer-readable medium comprising at least one instruction for causing a processor to perform operations is disclosed. The operations may include, for example, processing the reception of an instruction to perform a PRS measurement on a target band, wherein the PRS measurement is an inter-frequency PRS measurement associated with a PRS measurement occasion, estimating, for each transceiver of a plurality of transceivers associated with a UE, and based on one or more transmit frequency bands thereof, an interference with the inter-frequency PRS measurement, identifying a primary aggressor transceiver from among the plurality of transceivers, wherein the primary aggressor transceiver has a highest estimated interference, identifying an uplink transmission window associated with the primary aggressor transceiver, comparing the uplink transmission window to the PRS measurement occasion, selecting the identified primary aggressor transceiver as a selected transceiver in response to a determination that there is complete overlap between the uplink transmission window and the PRS measurement occasion, controlling the tuning of the selected transceiver to the target band, and performing the inter-frequency PRS measurement with the selected transceiver.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Many conventional UEs have multiple transceivers. A problem in multiple-transceivers UEs is that uplink transmissions transmitted using one transceiver may interfere with downlink transmissions (such as PRS measurements) received by one or more other transceivers. As a result, the UE may be unable to sense its position, or may be unable to sense its position with sufficient precision. Accordingly, new systems and methods are needed for mitigating downlink interference with one transceiver caused by uplink transmission by another transceiver.

Downlink interference may be difficult to predict without extensive testing. Accordingly, data relating to interference may be collected, provided to the UE, and used by the UE to mitigate downlink interference. To perform the testing on the multiple-transceiver UE, each band pairing of a particular target band with a particular uplink band may be identified. If uplink operations on the particular uplink band cause interference with downlink on the particular target band, then this knowledge may be provided to similar UEs, enabling them to mitigate interference associated with that band pairing.

For example, when a UE provided with the aforementioned interference data receives a PRS measurement instruction specifying a particular target band, the UE may choose the transceiver in a way that mitigates potential interference. As will be discussed in greater detail below, the amount of interference with the PRS measurement may be reduced if the interference data is taken into account when selecting the transceiver to perform the measurement.

Figure 1:
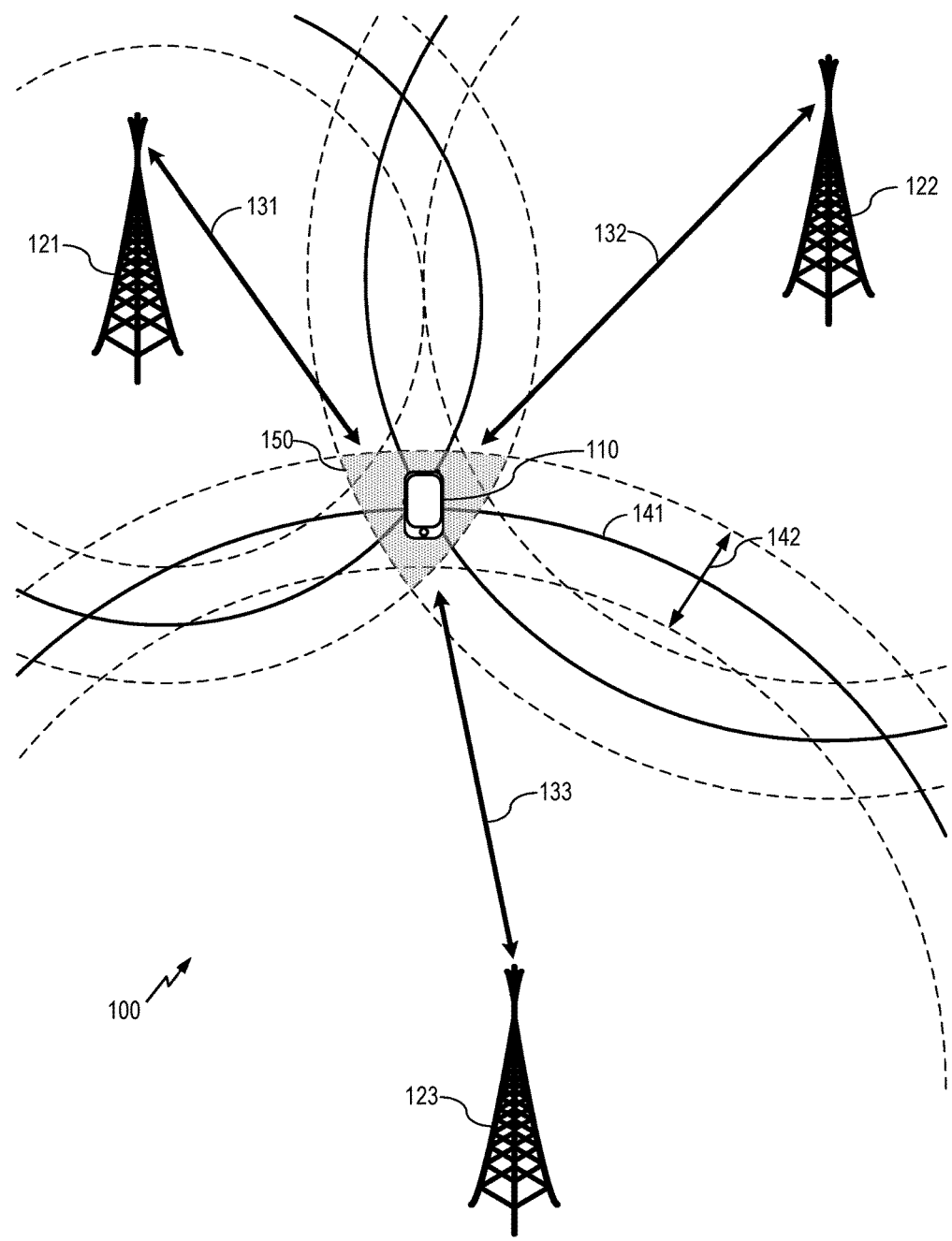
FIG. 1 generally illustrates a wireless environment in accordance with aspects of the disclosure.

FIG. 1 generally illustrates a wireless environment 100 in accordance with aspects of the disclosure.

Depicted in the wireless environment 100 are a UE 110 (where UE is an abbreviation of "user equipment"), a first eNB 121, a second eNB 122, and a third eNB 123 (wherein eNB is an abbreviation of "eNodeB"). The first eNB 121, the second eNB 122, and the third eNB 123 may be collectively referred to as "eNBs 120".

Each of the eNBs 120 may transmit a Positioning Reference Signal (PRS). FIG. 1 depicts a first PRS signal 131 transmitted by the first eNB 121, a second PRS signal 132 transmitted by the second eNB 122, and a third PRS signal 133 transmitted by the third eNB 123. The first PRS signal 131, the second PRS signal 132, and the third PRS signal 133 may be collectively referred to as "PRS signals 130".

Each of the PRS signals 130 may be transmitted at a pre-defined frequency. As used herein, the term "frequency" may refer to a bandwidth that includes a range of frequencies. For example, depending on the context, a frequency "20 MHz" may refer to the specific frequency value of 20 Mhz or a band of frequencies centered around 20 Mhz. Each of the PRS signals 130 may be associated with a set of configuration parameters. The configuration parameters may include a subframe offset ($\Delta_{PRS}$), a periodicity ($T_{PRS}$), a duration ($N_{PRS}$), a muting pattern, and a muting sequence periodicity ($T_{REP}$). Each of the PRS signals 130 may be transmitted during pre-defined positioning subframes grouped by several consecutive subframes $N_{PRS}$, which may be referred to as "positioning occasions". Positioning occasions occur periodically in accordance with the periodicity $T_{PRS}$. The period $T_{PRS}$ may be, for example, one-hundred and sixty subframes, three-hundred and twenty subframes, six hundred and forty subframes, or twelve hundred and eighty subframes. The number of consecutive subframes $N_{pRs}$ corresponding to a particular positioning occasion may be, for example, one, two, four, or six subframes.

Each of the PRS signals 130 may be independently configurable. Accordingly, the UE 110 needs to be informed of the PRS configuration for each of the respective PRS signals 130 and the expected time of arrival at the UE 110. Once the UE 110 has received the configuration data (from, for example, a location server and/or one of the eNBs 120), it can measure times of arrival (TOA) $\tau_1$, $\tau_2$, and $\tau_3$, corresponding, respectively, to the first PRS signal 131, the second PRS signal 132, and the third PRS signal 133. Each TOA may be measured with respect to an internal time base of the UE 110.

Once the three TOAs $\tau_1$, $\tau_2$, and $\tau_3$ have been determined, one of the three values is selected as a reference value. In FIG. 1, the value $\tau_1$, corresponding to the first PRS signal 131, is selected as the reference value. This value may be selected because, for example, it is received from a serving eNB, or for any other suitable reason. The reference value ($\tau_1$) may be subtracted from each of the remaining values ($\tau_2$ and $\tau_3$) to produce a pair of Reference Signal Time Difference (RSTD) measurements. In particular, a first RSTD value may be equal to $\tau_1$-$\tau_2$ and a second RSTD value may be equal to $\tau_1$-$\tau_3$.

Using the RSTDs, the UE 110 may be configured to infer a distance from the eNBs 120 and determine the position of the UE 110 based on the inferred distances. Position sensing that is performed in this manner may be referred to as Observed Time Difference of Arrival (OTDOA).

Each RSTD value may be associated with a curve 141 defining a set of possible locations. The width of the curve 141 may be associated with a measurement uncertainty 142. The curve 141, as it is labeled in FIG. 1, surrounds the third eNB 123. However, it will be understood that the first eNB 121 and the second eNB 122 have curves and measurement uncertainties (depicted but not labeled) that are analogous to the curve 141 and the measurement uncertainty 142. The UE 110 may be configured to establish, using OTDOA, that the position of the UE 110 is within an area of uncertainty 150. The area of uncertainty 150 may be a location where each of the respective curves intersect. The precision of the position sensing (and thus the size of the area of uncertainty 150) may depend on the degree of the measurement uncertainty 142.

To enable the RSTD measurements, a location server in the network may provide OTDOA assistance data to the UE 110. The OTDOA assistance data provided to the UE 110 may contain two sets of information. The first set of information, referred to as "OTDOA Reference Cell Info", contains parameters for the reference eNB (for example, the first eNB 121). The second set of information, referred to as "OTDOA Neighbor Cell Info", contains parameters for each of the neighbor eNBs (for example, the second eNB 122 and the third eNB 123). The neighbor eNBs in the OTDOA Neighbor Cell Info are sorted in decreasing order of priority. The UE 110 may be configured to perform the RSTD measurements (and/or report the RSTD measurement values) in the same order as provided by the OTDOA Neighbor Cell Info.

Figure 2:
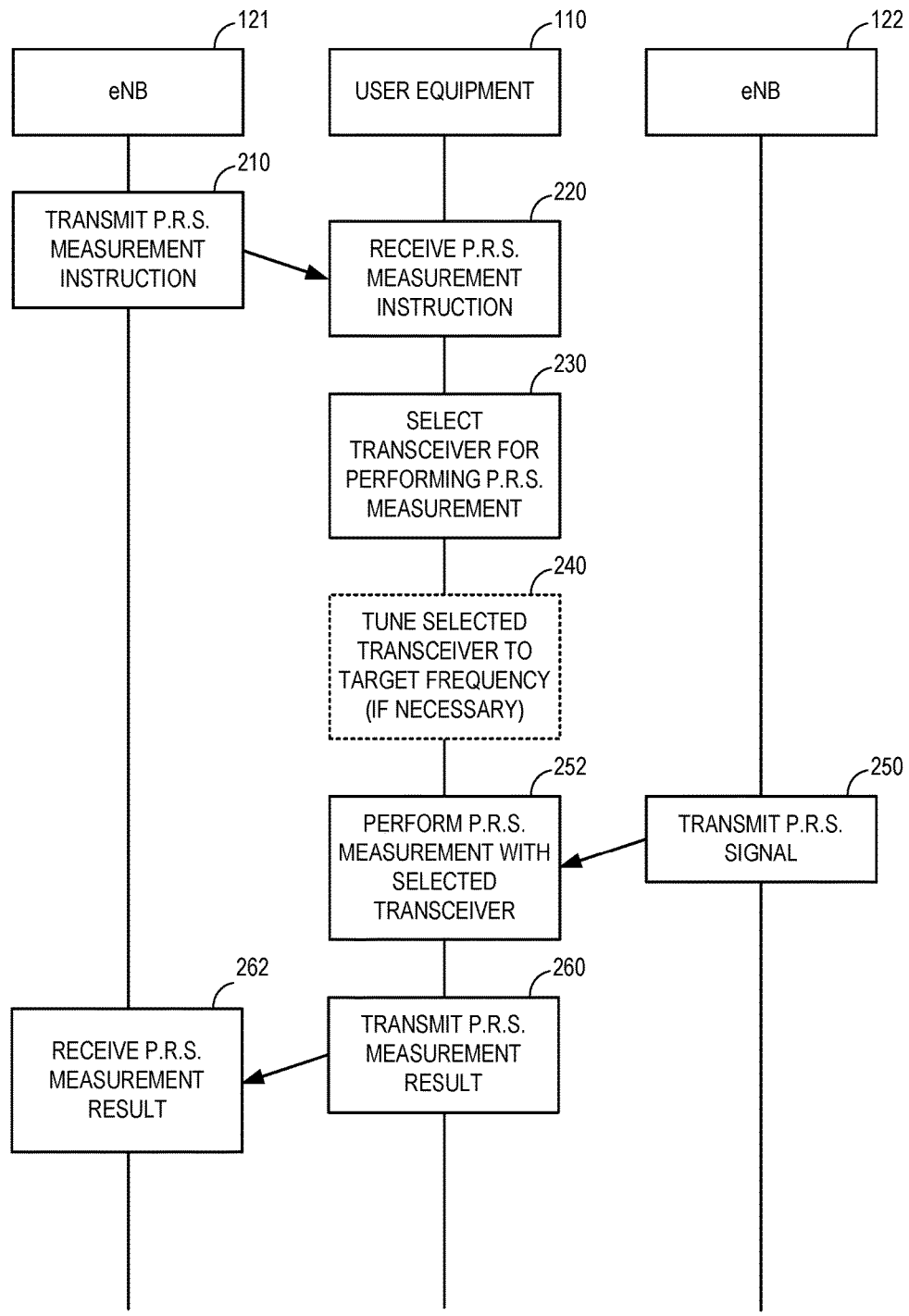
FIG. 2 generally illustrates a signal flow diagram that may be used to perform OTDOA position sensing within the wireless environment of FIG. 1.

FIG. 2 generally illustrates a signal flow diagram that may be used to perform OTDOA position sensing within the wireless environment 100 of FIG. 1.

At 210, the first eNB 121 transmits a PRS measurement instruction to the UE 110. At 220, the UE 110 receives the PRS measurement instruction transmitted from the first eNB 121. The instruction may be transmitted independently, or included in another signal (for example, the OTDOA assistance data described above). The instruction may also specify a target frequency $f_T$ for performing the PRS measurement.

In order to perform the instructed measurement, the UE 110 must tune at least one transceiver to the target frequency $f_T$ (unless the at least one transceiver is already tuned to the target frequency $f_T$). At 230, the UE 110 selects one of a plurality of transceivers to perform the PRS measurement. As will be discussed in greater detail below (in the section relating to FIG. 4), the selection at 230 may be performed in accordance with a selection algorithm in accordance with aspects of the disclosure.

In some scenarios, one or more of the transceivers is already tuned to the target frequency $f_T$, and at 230, the UE 110 may simply select the already-tuned transceiver to perform the PRS measurement. In this scenario, there is no need to re-tune the selected transceiver because it is already tuned to the target frequency $f_T$. However, if none of the transceivers are tuned to the target frequency $f_T$, then it may be necessary to tune the selected transceiver. Accordingly, at 240, the UE 110 tunes, if tuning is necessary, the selected transceiver to the target frequency $f_T$.

At 250, a target eNB (for example, the second eNB 122) transmits a PRS signal. The PRS signal may be transmitted using a band that includes the target frequency $f_T$. As noted above, positioning occasions occur periodically with a certain periodicity $T_{PRS}$. The transmitting at 250 may be performed during a positioning occasion. At 252, the UE 110 performs a PRS measurement of the PRS signal transmitted by the target eNB using the selected transceiver. As noted above, the UE 110 may use the OTDOA assistance data to predict when the positioning occasion will occur. Accordingly, the UE 110 may be configured to perform the tuning at 240 (if necessary) at some point prior to the next predicted positioning occasion.

At 260, the UE 110 reports the result of the PRS measurement to the first eNB 121. At 262, the first eNB 121 receives the report. The first eNB 121 may in turn relay the report to, for example, a location server (not shown). Means for performing the functionalities of blocks 220, 230, 240, 252, and/or 260 can, but not necessarily, include, for example, transceivers 331, 332, 333, memory 320, and/or processing system 310 with reference to FIG. 3.

The process depicted in FIG. 2 may be repeated for another target eNB (for example, the third eNB 123), which may or may not use a different target frequency $f_T$ (and may or may not require additional tuning).

Figure 3:
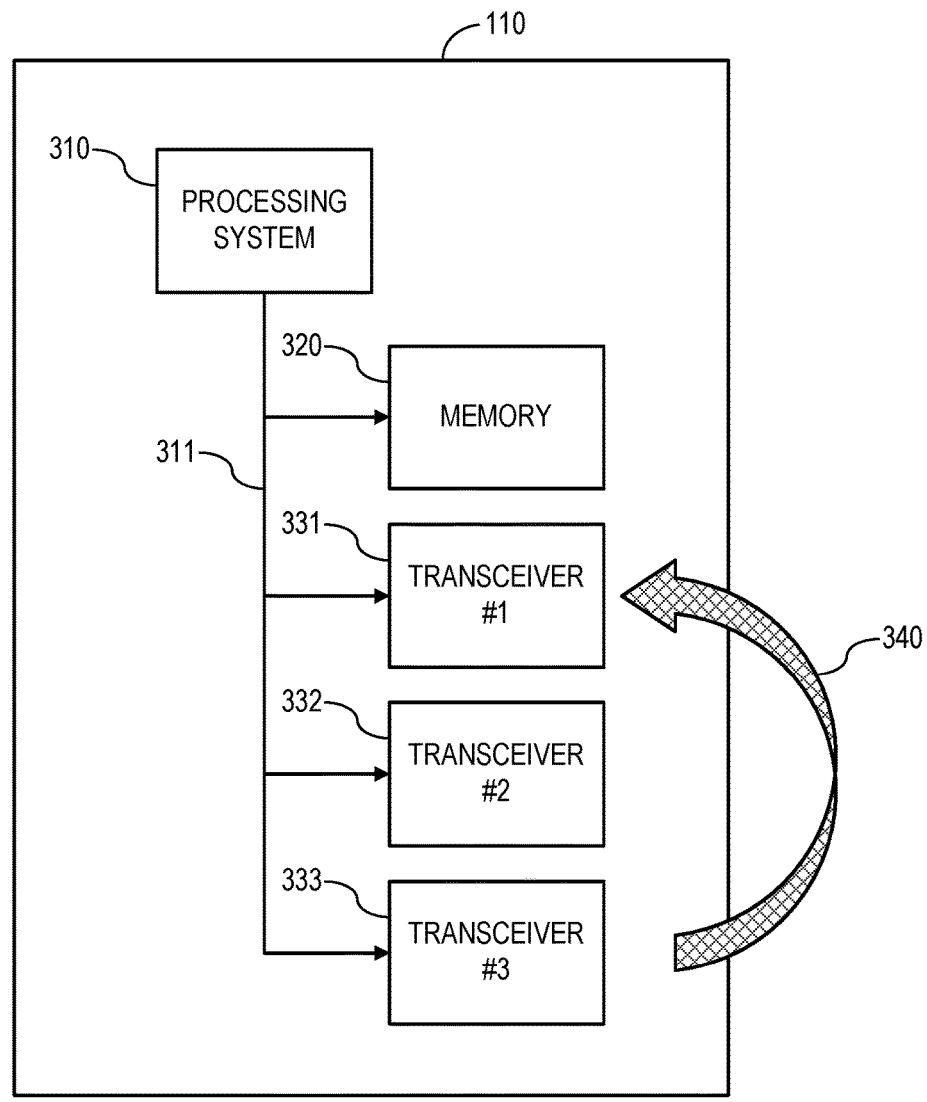
FIG. 3 generally illustrates an example implementation of the user equipment depicted in FIG. 1.

FIG. 3 generally illustrates an example implementation of the UE 110 depicted in FIG. 1.

The UE 110 may include a processing system 310, a memory 320, a first transceiver 331, a second transceiver 332, and a third transceiver 333. The first transceiver 331, the second transceiver 332, and the third transceiver 333 may be collectively referred to as the "transceivers 330". It will be understood that FIG. 3 is provided solely for illustration, and that the UE 110 may include three transceivers, or any other number of transceivers. The components of the UE 110 may be coupled to one another via a bus 311. The UE 110 may communicate with one or more of the eNBs 120 using one or more of the transceivers 330. Signals received from one of the eNBs 120 may be referred to as "downlink" signals, whereas signals transmitted by the UE 110 to one or more of the eNBs 120 may be referred to as "uplink" signals. Each of the transceivers 330 may be independently tunable to a range of different frequencies, and each may be independently configured to receive downlink signals at a particular frequency (such as the PRS signals 130) and/or transmit uplink signals at the particular frequency.

The memory 320 may comprise a transitory or non-transitory computer-readable medium that contains data and/or instructions. The memory 320 may provide the data and/or the instructions to the processing system 310, which may be configured to perform processing tasks associated with the data and/or instructions. The operations performed by the processing system 310 based on the instructions can include operations, for example, similar to those described with reference to FIGS. 2, 4, and 7. More particularly, the instructions can include code for the processing system 310 to perform operations including processing the reception of an instruction to perform an inter-frequency PRS measurement, estimating an interference based on transmit frequency bands of a plurality of transceivers with the inter-frequency PRS measurement, identifying a primary aggressor transceiver, identifying an uplink transmission window associated with the primary aggressor transceiver, comparing the uplink transmission window to the PRS measurement occasion, selecting the identified primary aggressor transceiver as a selected transceiver in response to a determination that there is complete overlap between the uplink transmission window and the PRS measurement occasion, controlling the tuning of the selected transceiver to a target band, and performing the inter-frequency PRS measurement with the selected transceiver. The transceivers 330 may be configured to receive signals (on the downlink) and/or transmit signals (on the uplink). The transceivers 330 may perform these tasks in response to commands received from the processing system 310 and/or memory 320.

One or more of the transceivers 330 may be configured to perform the receiving at 220 depicted in FIG. 2. The receiving at 220 may be performed in accordance with commands received from the processing system 310. Accordingly, the processing system 310 and/or one or more of the transceivers 330 may constitute means for receiving a PRS measurement instruction.

The processing system 310 may be configured to perform and/or command the performance of the selecting at 230, the tuning at 240 (if necessary), and the measuring at 252. The tuning at 240 and the measuring at 252 may also be performed using one or more of the transceivers 330. Accordingly, the processing system 310 and/or one or more of the transceivers 330 may constitute means for selecting a transceiver for performing the PRS measurement, means for tuning the selected transceiver to the target frequency, and means for performing the PRS measurement with the selected transceiver.

One or more of the transceivers 330 may be configured to perform the reporting at 260. The reporting at 260 may be performed in accordance with commands received from the processing system 310. Accordingly, the processing system 310 and/or one or more of the transceivers 330 may constitute means for reporting the PRS measurement result.

A problem in conventional UEs is that uplink transmissions transmitted using one transceiver may interfere with downlink transmissions received by one or more other transceivers. For example, as depicted in FIG. 3, the third transceiver 333, which may be transmitting an uplink transmission, causes interference 340 with the first transceiver 331, which may be attempting to measure a PRS signal during a positioning occasion. The interference 340 caused by the third transceiver 333 may make it difficult for the first transceiver 331 to perform accurate measurements of the received PRS signal. As a result, the UE 110 may be unable to sense its position, or the area of uncertainty 150 may increase in size. In accordance with aspects of the disclosure, interference analogous to the interference 340 may be predicted. Moreover, the interference may be eliminated by selecting a particular transceiver for tuning.

Research is necessary to predict when the interference 340 will occur, and which transceivers or signals will be impacted. For example, testing related to the present disclosure suggests that if the third transceiver 333 transmits an uplink transmission on LTE band b17 while the first transceiver 331 simultaneously receives a downlink transmission on LTE band b4 (where LTE is an abbreviation of "Long Term Evolution", which is a set of wireless communication standards), then the first transceiver 331 may have difficulty receiving the downlink transmission due to the interference 340. Uplink transmission on LTE band b8 may have similar effects on reception of downlink signals on LTE band b3, and uplink transmission on LTE band b26 may have similar effects on reception of downlink signals on LTE band b1. This may not be a complete list of all the possible sources of interference. As will be discussed in greater detail below (with reference to FIGS. 6-7), it may be possible to chart any number of possible interactions between uplinks on one band and interference with another band.

Figure 4:
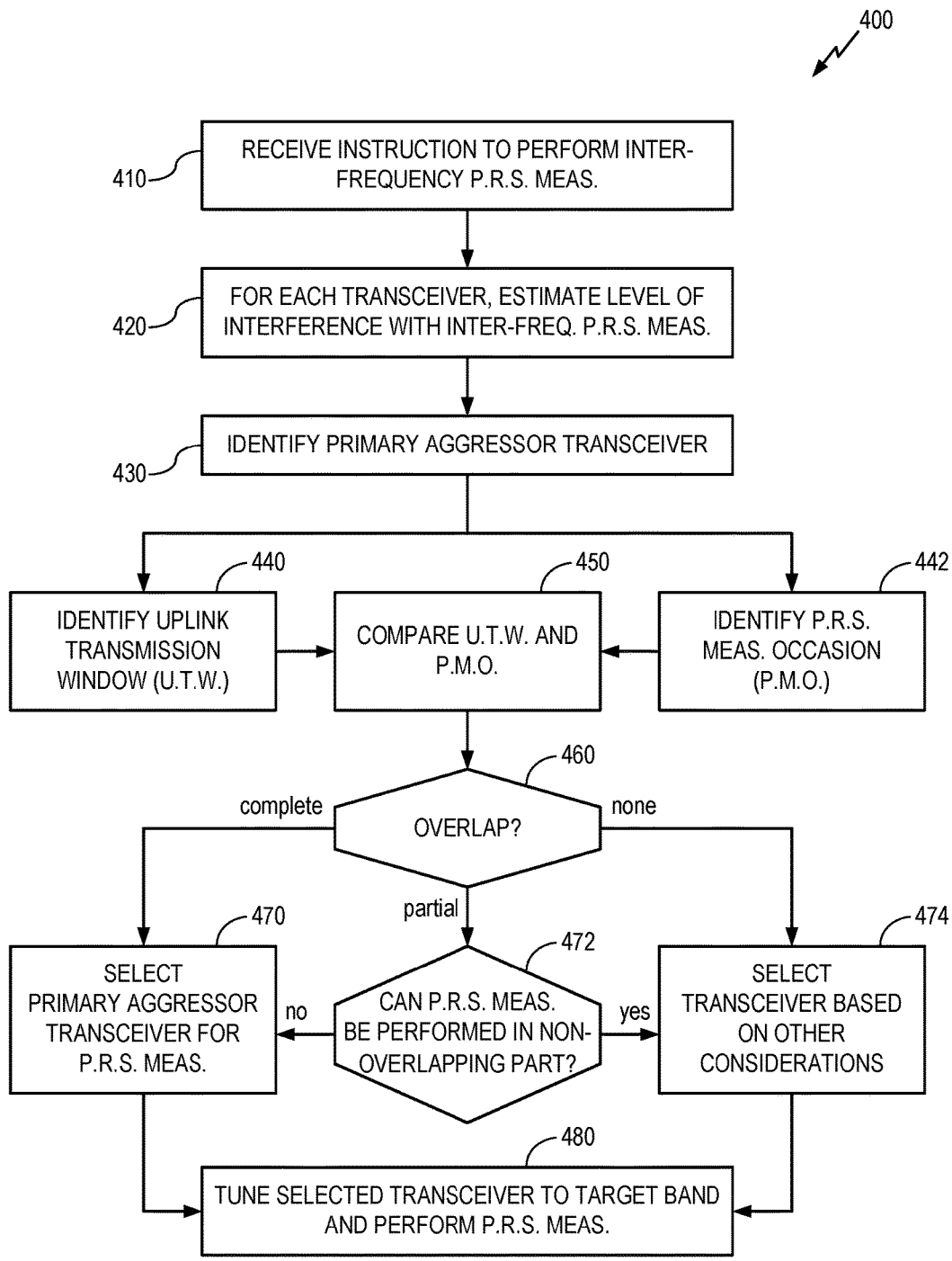
FIG. 4 generally illustrates a transceiver selection algorithm for limiting interference.

FIG. 4 generally illustrates a transceiver selection algorithm 400 for limiting interference (analogous, for example, to the interference 340 depicted in FIG. 3). As will be understood by the following description, the transceiver selection algorithm 400 may be used to perform the receiving 220, selecting 230, if-necessary tuning 240, and measuring 252 depicted in FIG. 2. The transceiver selection algorithm 400 will be described as it would be performed by the UE 110 as depicted in FIG. 3, however, it will be understood that the transceiver selection algorithm 400 may be performed by any analogous device.

At 410, the UE 110 receives an instruction to perform an inter-frequency PRS measurement. As noted above, the instruction may be received in OTDOA assistance data and may specify a particular target frequency $f_T$ (or a related band) and/or a particular timing of positioning occasions. The instructed PRS measurement may be identified as an inter-frequency PRS measurement in the event no transceiver of the transceivers 330 is tuned to the target frequency $f_T$. The transceiver selection algorithm 400 may enable the UE 110 to limit interference of the type depicted in FIG. 3 by selecting a particular transceiver for the purpose of performing the instructed inter-frequency PRS measurement. Means for performing the functionality of block 410 can, but not necessarily, include, for example, transceivers 331, 332, 333, memory 320, and/or processing system 310 with reference to FIG. 3.

At 420, the UE 110 estimates, for each of the transceivers 330, a corresponding interference with the instructed PRS measurement caused by that transceiver. As an example, suppose that the first transceiver 331 is operating on b1, the second transceiver 332 is operating on b3, and the third transceiver 333 is operating on b17. Suppose further that the instruction received at 410 specifies that the PRS measurement be performed on b4. The UE 110 may initially perform the estimating at 420 by determining whether uplink on b1 (as performed by the first transceiver 331) will interfere with the instructed PRS measurement on b4. Next, the UE 110 may determine whether uplink on b3 (as performed by the second transceiver 332) will interfere with the instructed PRS measurement on b4. Finally, the UE 110 may determine whether uplink on b17 (as performed by the third transceiver 333) will interfere with the instructed PRS measurement on b4. Once the estimating at 420 has been performed for each of the transceivers 330, the transceiver selection algorithm may proceed to 430. As will be discussed in greater detail below (with respect to FIGS. 6-7), in some implementations the estimates can be derived from an aggressor victim data set that is accessible to the UE 110.

The estimating at 420 may be performed in any suitable manner. In one possible implementation, the estimating at 420 is based on interference estimate data points in an aggressor-victim data set, as will be discussed in greater detail below. The aggressor-victim data set may comprise a first dimension representing one or more target bands and a second dimension representing one or more potential aggressor bands (PABs), wherein the aggressor-victim data set includes an interference estimate data point for each band pairing of a target band and a PAB. In addition, the estimating at 420 may be performed by identifying the PAB to which the each transceiver of the plurality of transceivers is tuned, identifying the target band associated with the received instruction, and retrieving, from the aggressor-victim data set, an interference estimate data point value corresponding to a band pairing of the identified PAB and the identified target band. Accordingly, the estimating at 420 may further comprise identifying the PAB to which the each transceiver of the plurality of transceivers is tuned, identifying the target band associated with the received instruction, and retrieving, from the aggressor-victim data set, an interference estimate data point value corresponding to a band pairing of the identified PAB and the identified target band.

At 430, the UE 110 identifies a primary aggressor transceiver from among the transceivers 330. The "primary aggressor transceiver" may be the transceiver that, when operating on the frequency it is presently tuned to, is capable of causing the highest interference. The remaining transceivers may be referred to as secondary aggressor transceivers (if they cause interference to a lesser degree than the primary aggressor transceiver) or non-aggressor transceivers (if they are not estimated to cause interference). After the identifying at 430 has been performed, the transceiver selection algorithm 400 proceeds in parallel to 440 and 442.

At 440, the UE 110 identifies an uplink transmission window (UTW) associated with the primary aggressor transceiver. If the primary aggressor transceiver identified at 430 is operating in accordance with a time-division duplexing (TDD) scheme, then the characteristics of the UTW (for example, start time, window duration, and/or end time) may be determined based on an uplink schedule. If the primary aggressor transceiver is operating in accordance with a frequency-division duplexing (FDD) scheme that uses a discontinuous transmission (DTX) pattern, then the characteristics of the UTW may be determined based on the DTX pattern. For example, in an implementation with an FDD scheme, block 440 can comprise identifying the uplink transmission window based on a transmitting part of a DTX pattern.

At 442, the UE 110 identifies a PRS measurement occasion (which may be abbreviated as "PMO"). The PMO may correspond to the positioning occasion described above, as specified in the OTDOA assistance data. Once the identifying at 440 and the identifying at 442 have been performed, the transceiver selection algorithm 400 proceeds to 450.

Figure 5A:
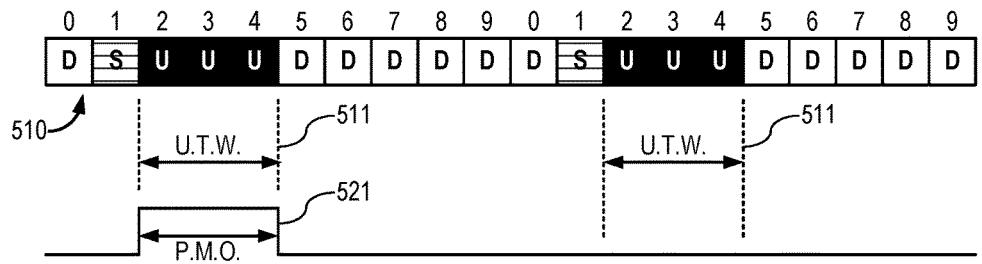
FIG. 5A generally illustrates a timing diagram for a case in which there is complete overlap between an uplink transmission window and a PRS measurement occasion.
Figure 5B:
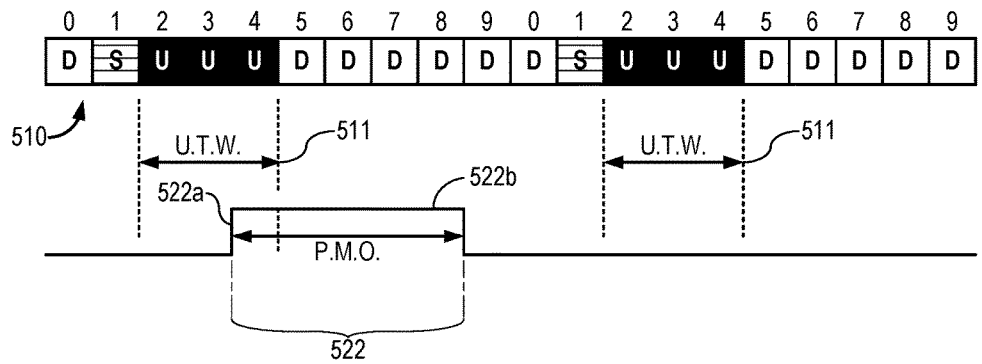
FIG. 5B generally illustrates a timing diagram for a case in which there is partial overlap between an uplink transmission window and a PRS measurement occasion.
Figure 5C:
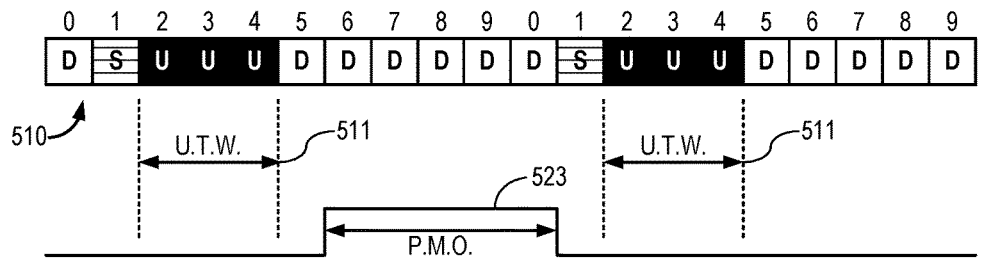
FIG. 5C generally illustrates a timing diagram for a case in which there is no overlap between an uplink transmission window and a PRS measurement occasion.

At 450, the UE 110 compares the UTW identified at 440 with the PMO identified at 442. At 460, the UE 110 determines, based on the comparing at 450, whether there is overlap between the UTW and the PMO. Overlap may occur when the UTW (or a portion thereof) is scheduled at the same time as the PMO (or a portion thereof). FIGS. 5A-5C, as will be discussed in greater detail below, depict several comparison scenarios. In a first comparison scenario, the UE 110 determines that there is complete overlap between the UTW and the PMO and then proceeds to 470 ('complete' at 460). In a second comparison scenario, the UE 110 determines that there is partial overlap between the UTW and the PMO and then proceeds to 472 ('partial' at 460). In a third comparison scenario, the UE 110 determines that there is no overlap between the UTW and the PMO and then proceeds to 474 ('none' at 460).

At 470, the UE 110 selects the primary aggressor transceiver (identified at 430) for performing the PRS measurement. At 474, the UE 110 selects a transceiver based on other considerations (i.e., not based on a determination that the selected transceiver is the primary aggressor transceiver, but rather on some other consideration). For example, at 474, a transceiver may be selected based on one or more of a plurality of factors, including a group delay associated with the selected transceiver, a time of arrival associated with the selected transceiver, and/or a sensitivity of the selected transceiver. Any of the transceivers 330 may be selected at 474 in accordance with one or more of the plurality of factors, including the primary aggressor transceiver, a secondary aggressor transceiver, or a non-aggressor transceiver. In some implementations, the selecting at 474 is based on a weighted combination of one or more of the plurality of factors, wherein each factor value is assigned a weighting coefficient.

The group delay may be a change in phase with respect to frequency, and may be specific to a particular transceiver and/or frequency. When the PRS signal is received by an antenna, the group delay may correspond to the amount of time it takes, beginning at reception, to perform the necessary signal processing (with suitable hardware, firmware, and/or software). A lower value of group delay may be preferred to a higher value of group delay. Accordingly, if all else is equal (or if group delay is the only factor), then the transceiver associated with the lowest group delay would be selected as the selected transceiver.

The time of arrival, as noted above, is determined for each of the PRS signals 130 (recall that in the example of FIG. 1, times of arrival $\tau_1$, $\tau_2$, and $\tau_3$, correspond, respectively, to the first PRS signal 131, the second PRS signal 132, and the third PRS signal 133). A lower value of time of arrival may be preferred to a higher value of time of arrival. Accordingly, if all else is equal (or if time of arrival is the only factor), then the transceiver associated with the shortest time of arrival would be selected as the selected transceiver.

The sensitivity may be specific to a particular transceiver, and may vary based on the components and/or arrangement of the particular transceiver. If all else is equal, transceivers that make noisier readings will have lower sensitivity, and transceivers that avoid noise will have higher sensitivity. A higher sensitivity may be preferred to a lower sensitivity. Accordingly, if all else is equal (or if sensitivity is the only factor), then the transceiver associated with the lowest sensitivity would be selected as the selected transceiver.

At 472, the UE 110 determines if the instructed PRS measurement can be performed during a non-overlapping part of the PMO. If the instructed PRS measurement can not be performed during a non-overlapping part of the PMO ('no' at 472), then the transceiver selection algorithm proceeds to 470 (wherein the primary aggressor transceiver is selected). If the instructed PRS measurement can be performed during the non-overlapping part of the PMO ('yes' at 472), then the transceiver selection algorithm proceeds to 474 (wherein the transceiver is selected based on other considerations). Means for performing the functionalities of blocks 420, 430, 440, 442, 450, 460, 470, 472, and 474 can, but not necessarily, include, for example, memory 320, and/or processing system 310 with reference to FIG. 3.

In a time-division duplexing scheme (abbreviated as "TDD"), uplink may be limited to a first group of specific subframes and the remaining subframes may be dedicated to downlink. Accordingly, there may be complete overlap, partial overlap, or no overlap between the UTW and the PMO. By contrast, in a frequency-division duplexing scheme (abbreviated as "FDD"), the uplink and downlink may occur simultaneously. However, if a transceiver operating in accordance with FDD uses a discontinuous transmission pattern, then transmitting occurs intermittently. At 480, the UE 110 tunes the transceiver selected at 470 or 474 to the target frequency $f_T$ (or the related band). The UE 110 is then ready to perform the instructed PRS measurement. The UE 110 may command the selected transceiver to perform the PRS measurement during, for example, the next PMO (or a non-overlapping portion thereof, in the event that there is partial overlap, as determined at 460). Means for performing the functionality of block 480 can, but not necessarily, include, for example, transceivers 331, 332, 333, memory 320, and/or processing system 310 with reference to FIG. 3.

FIG. 5A generally illustrates a timing diagram for a case in which there is complete overlap between the UTW and the PMO.

FIG. 5A includes a TDD timing diagram 510 that is broken down into repeating sequences of subframes numbered "0"-"9". Some of the subframes are used for uplink and some of the subframes are used for downlink (marked as "U" and "D" respectively). In the example of FIG. 5A, the subframes numbered "2"-"4" are dedicated to uplink, and therefore constitute the UTW 511. The duration of the UTW 511 is equal to three subframes. However, it will be understood that the TDD timing diagram 510 depicted in FIG. 5A is provided solely for illustration, and that any particular numbering or grouping of subframes may constitute the UTW 511. The primary aggressor transceiver may operate in accordance with the TDD timing diagram 510.

As noted above, the UE 110 may receive OTDOA assistance data that identifies a particular target frequency $f_T$ and indicates the timing of the positioning occasions. The duration of each positioning occasion may correspond to the PMO 521. As can be seen from FIG. 5A, there is no portion of the PMO 521 that does not overlap with the UTW 511 of the primary aggressor transceiver (subframes "2"-"4"). Returning briefly to FIG. 4, it will be understood that the comparing at 450 may be a comparison of the UTW 511 to the PMO 521. The result of the comparison at 450 would be a determination that there is complete overlap between the UTW 511 and the PMO 521, and the transceiver selection algorithm 400 would proceed to 470.

FIG. 5B generally illustrates a timing diagram for a case in which there is partial overlap between UTW and PMO.

Similar to FIG. 5A, FIG. 5B depicts the TDD timing diagram 510, in which the subframes numbered "2"-"4" are dedicated to uplink, and therefore constitute the UTW 511. However, in this case, the OTDOA assistance data indicates a different duration with a different start time. Accordingly, the PMO 522 may consist of an overlapping portion 522a and a non-overlapping portion 522b (collectively referred to as "PMO 522"). Returning briefly to FIG. 4, it will be understood that the comparing at 450 may be a comparison of the UTW 511 to the PMO 522. The result of the comparison at 450 would be a determination that there is partial overlap between the UTW 511 and the PMO 522, and the transceiver selection algorithm 400 would proceed to 472.

At 472, the UE 110 would, in accordance with the example of FIG. 5B, determine that the non-overlapping portion 522b consists of four subframes, and would determine whether the instructed PRS measurement can be performed during the non-overlapping portion 522b.

FIG. 5C generally illustrates a timing diagram for a case in which there is no overlap between UTW and PMO.

Similar to FIG. 5A, FIG. 5C depicts the TDD timing diagram 510, in which the subframes numbered "2"-"4" are dedicated to uplink, and therefore constitute the UTW 511. However, in this case, the OTDOA assistance data again indicates a different duration with a different start time. Unlike the PMO 521 and PMO 522 depicted in FIGS. 5A-5B, a PMO 523 as depicted in FIG. 5C may not overlap at all with the UTW 511. Returning briefly to FIG. 4, it will be understood that the comparing at 450 may be a comparison of the UTW 511 to the PMO 523. The result of the comparison at 450 would be a determination that there is no overlap between the UTW 511 and the PMO 523, and the transceiver selection algorithm 400 would proceed to 474.

In the context of FIGS. 3 and 5A-5C, an example of the operation of the transceiver selection algorithm 400 depicted in FIG. 4 is presently provided. Returning to an earlier example, suppose that the first transceiver 331 is operating on b1, the second transceiver 332 is operating on b3, and the third transceiver 333 is operating on b17. Suppose further that the instruction received at 410 specifies that the PRS measurement be performed on b4. The UE 110 may estimate (at 420) that the third transceiver 333, which operates on b17, will cause interference with any transceiver that is attempting to measure the PRS signal on b4. The UE 110 may further estimate at 420 that the first transceiver 331 and the second transceiver 332 are either non-aggressor transceivers (those that cause no interference with any transceiver that is attempting to measure the PRS signal on b4) or secondary aggressor transceivers (those that cause interference on b4, but cause less interference than the primary aggressor transceiver). As a result of these estimations, the UE 110 may identify the third transceiver 333 as the primary aggressor transceiver (at 430).

The identifications at 440 and 442 and the comparison at 450 and 460 may be performed as suggested by FIGS. 5A-5C. In particular, the UE 110 may identify the UTW 511 based on the known timing parameters of the TDD performed by the third transceiver 333. In the event of complete overlap (as in FIG. 5A), the third transceiver 333 is selected at 470 and tuned to b4 at 480. After the tuning is complete, the first transceiver 331 is operating on b1, the second transceiver 332 is operating on b3, and the third transceiver 333 is operating on b4. The third transceiver 333 was determined to be the primary aggressor transceiver, so by tuning the primary aggressor transceiver away from b17 (to b4), the impact of the interference 340 can be limited. Because uplink transmissions on b1 and b3 do not interfere with PRS measurements on b4 (or at least interfere less than would uplink transmission on b17), the transceiver selection algorithm 400 may be used to reduce the impact of interference.

In the event of partial overlap (as in FIG. 5B), the third transceiver 333 is selected at 470 if the PRS measurement can not be performed during the non-overlapping portion 522b of the PMO 522. As depicted in FIG. 5B, the non-overlapping portion 522b may have a duration of four subframes, numbered "5"-"8". Accordingly, if four subframes are not sufficient for performing the instructed PRS measurement, then the transceiver selection algorithm 400 may proceed from 472 to 470, where the primary aggressor transceiver (the third transceiver 333 in the present example) may be selected. On the other hand, if four subframes are sufficient for performing the instructed PRS measurement, then the transceiver selection algorithm 400 may proceed from 472 to 474, where a transceiver is selected in accordance with other considerations.

In the event of no overlap (as in FIG. 5C), there is no danger of uplink transmissions interfering with the instructed PRS measurement. Accordingly, the transceiver may be selected at 474 based on other considerations. As noted above, the other considerations that affect the selection at 474 may include transceiver usage, transceiver data rate, or some other characteristic of the selected transceiver. Yet another consideration may be the transceivers' status as a secondary aggressor. For example, the UE 110 may estimate that the third transceiver 333 will cause 10 dBm of interference (making it the primary aggressor) and that the second transceiver 332 will cause 7 dBm of interference. Accordingly, at 474, a secondary aggressor may be selected (for example, the secondary aggressor with the highest estimated interference level).

Figure 6:
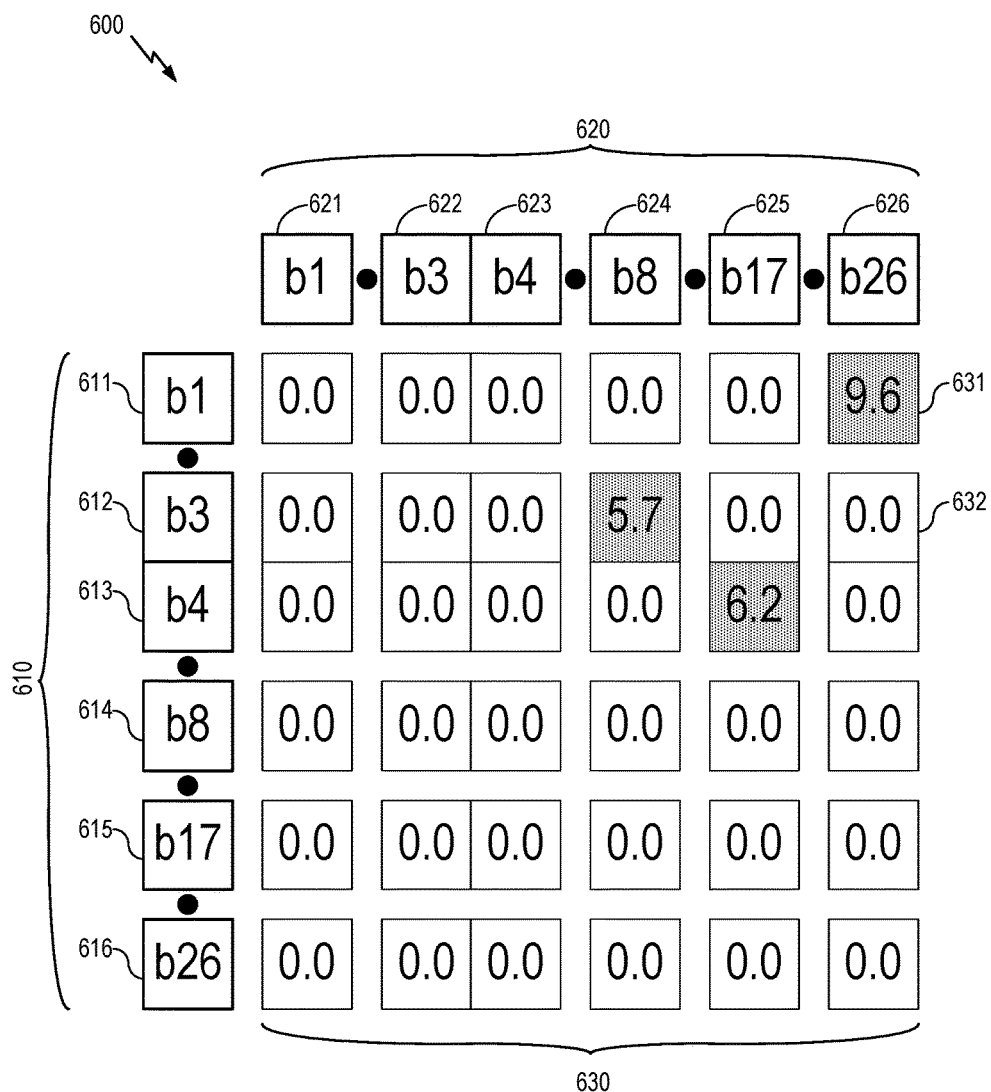
FIG. 6 generally illustrates a representation of an aggressor-victim data set that may facilitate implementation of the transceiver selection algorithm of FIG. 4.

FIG. 6 generally illustrates a representation of an aggressor-victim data set (AVDS) 600.

The AVDS 600 is a two-dimensional data array having a first dimension (vertical as depicted in FIG. 6) representing one or more target bands 610 and a second dimension (horizontal as depicted in FIG. 6) representing one or more potential aggressor bands (PABs) 620. The AVDS 600 may be stored at the UE 110 (for example, in the memory 320 of FIG. 3). The AVDS 600 may facilitate performance of the estimating at 420 (as depicted in FIG. 4).

The target bands 610 may comprise a first target band 611, a second target band 612, a third target band 613, a fourth target band 614, a fifth target band 615, and a sixth target band 616. In the example of FIG. 6, the target bands 610 correspond to particular LTE bands b1, b3, b4, b8, b17, and b26. However, it will be understood that the target bands 610 may omit one or more of the bands depicted in FIG. 6 and/or may include other bands not depicted in FIG. 6.

The PABs 620 may comprise a first PAB 621, a second PAB 622, a third PAB 623, a fourth PAB 624, a fifth PAB 625, and a sixth PAB 626. In the example of FIG. 6, the PABs 620 correspond to particular LTE bands b1, b3, b4, b8, b17, and b26. However, it will be understood that the PABs 620 may omit one or more of the bands depicted in FIG. 6 and/or may include other bands not depicted in FIG. 6. The number and identity of target bands 610 happens to be equal to the number and identity of PABs 620 in the example of FIG. 6, however, it will be understood that the respective numbers may be unequal without departing from the scope of the present disclosure.

The AVDS 600 further comprises one or more interference estimate data points 630. Each of the interference estimate data points 630 may correspond to a band pairing of a target band (from among the target bands 610) and a PAB (from among the PABs 620). For example, the band pairing of the second target band 612 and the fourth PAB 624 is associated with an interference estimate data point with a value of "5.7". In the example of FIG. 6, there are six bands in both dimensions and thirty-six interference estimate data points. However, it will be understood that the interference estimate data points 630 may include any number of data points, depending on the number of target bands 610 and PABs 620.

Two of the interference estimate data points 630 are labeled as a first data point 631 (corresponding to the band pairing of first target band 611 and sixth PAB 626) and a second data point 632 (corresponding to the band pairing of second target band 612 and sixth PAB 626). As depicted in FIG. 6, the first data point 631 may have a value of "9.6". The value of the interference estimate data point may constitute an interference estimate and/or provide data that enables the UE 110 to arrive at an interference estimate. For example, the value of the first data point 631 may indicate that "9.6 dBm" is the amount of estimated interference to reception on the first target band 611 when transmitting on the uplink using the sixth PAB 626. As another example, the first data point 631 may indicate that "9.6 dBm" is the amount of estimated interference when transmitting at a specific baseline uplink transmit power (for example, 10 dBm). In the latter example, the UE 110 may arrive at the specific interference estimate by revising the "9.6" value based on, for example, a ratio of the actual uplink transmit power (associated with a transceiver operating on the sixth PAB 626) and the baseline uplink transmit power. The second data point 632 may have a value of "0.0". The value "0.0" may indicate that the sixth PAB 626 will not interfere with downlink on the second target band 612.

When performing the estimating at 420 (as depicted in FIG. 4), the UE 110 may begin by identifying the target band (for example, the first target band 611). Then, for each of the transceivers 330, the UE 110 may identify the frequency or band to which the particular transceiver is tuned and locate, in the AVDS 600, a corresponding interference estimate data point. As such, block 420 can comprise identifying the PAB to which each transceiver of the plurality of transceivers is tuned, identifying the target band associated with the received instruction (block 410), and retrieving, from the AVDS 600, an interference estimate data point value corresponding to a band pairing of the identified PAB and the identified target band. For example, if the first transceiver 331 is tuned to the second PAB 622, the UE 110 may find a data point in the AVDS 600 that corresponds to the second PAB 622 and the first target band 611. As depicted in FIG. 6, this interference estimate data point has a value of "0.0", indicating that the second PAB 622 is a non-aggressor band that will not interfere with measurements on the first target band 611. However, if the second transceiver 332 is tuned to the sixth PAB 626, the UE 110 may find an interference estimate data point with a value of "9.6". As discussed previously, the value "9.6" may indicate that the sixth PAB 626 is an aggressor band that will interfere with measurements on the first target band 611.

As discussed previously, each of the interference estimate data points 630 may provide data that enables the UE 110 to arrive at a specific interference estimate. In the previous example, the value retrieved by the AVDS 600 corresponds to a particular baseline uplink transmission power (for example, 10 dBm) and may be adjusted based on a difference between the particular baseline uplink transmission power and an actual uplink transmission power. This method of adjustment may be adequate if, for example, the interference estimate can be modeled as an algebraic function of uplink transmission power.

In a variation of the AVDS 600, a third dimension may be added, the third dimension corresponding to a range of uplink transmission powers (for example, 1 dBm, 10 dBm, 100 dBm, etc.). As a result, the AVDS 600 variant may be relatively larger in size. However, in some scenarios it may be optimal to adopt the three-dimensional variant of AVDS 600. For example, if the interference estimate can not be modeled as an algebraic function of uplink transmission power, then the three-dimensional variant of AVDS 600 may be better suited for estimating interference.

Figure 7:
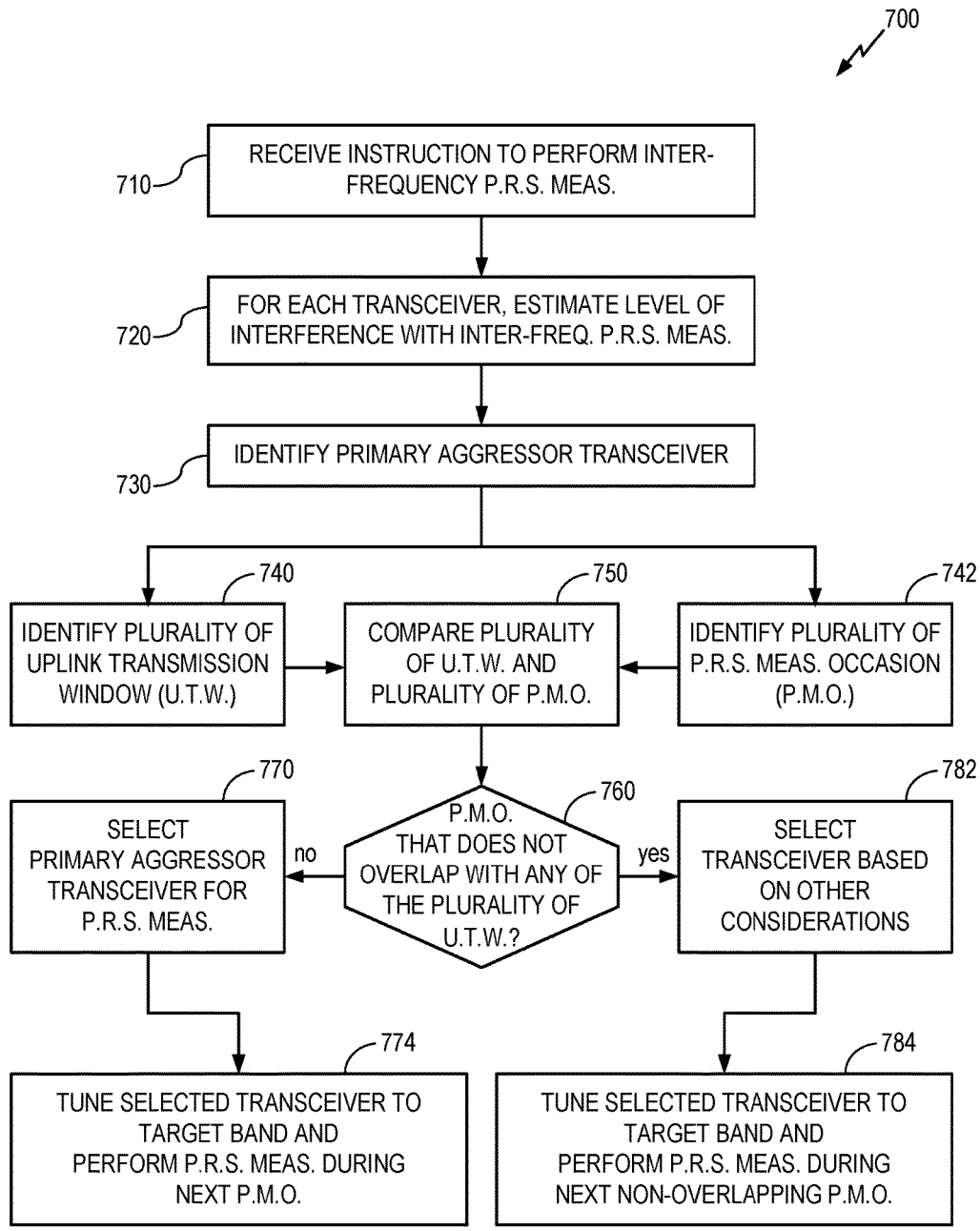
FIG. 7 generally illustrates another transceiver selection algorithm for limiting interference.

FIG. 7 generally illustrates a transceiver selection algorithm 700 for limiting interference (analogous, for example, to the interference 340 depicted in FIG. 3). The transceiver selection algorithm 700 may be performed in addition to the transceiver selection algorithm 400 depicted in FIG. 4, or as an alternative to the transceiver selection algorithm 400 depicted in FIG. 4. The transceiver selection algorithm 700 will be described as it would be performed by the UE 110 as depicted in FIG. 3, however, it will be understood that the transceiver selection algorithm 700 may be performed by any analogous device.

The first three blocks 710-730 depicted in FIG. 7 are analogous to the first three blocks 410-430 depicted in FIG. 4. For brevity, they will be described briefly as follows. At 710, the UE 110 receives an instruction to perform an inter-frequency PRS measurement. At 720, the UE 110 estimates, for each of the transceivers 330, a corresponding interference with the instructed PRS measurement caused by that transceiver. At 730, the UE 110 identifies a primary aggressor transceiver from among the transceivers 330.

After the identifying at 730 has been performed, the transceiver selection algorithm 700 proceeds in parallel to 740 and 742.

At 740, the UE 110 identifies a plurality of uplink transmission windows (which may be abbreviated as "UTWs") associated with the primary aggressor transceiver. If the primary aggressor transceiver identified at 730 is operating in accordance with a time-division duplexing (TDD) scheme, then the characteristics of the plurality of UTWs (for example, start time, window duration, and/or end time) may be determined based on an uplink schedule. If the primary aggressor transceiver is operating in accordance with a frequency-division duplexing (FDD) scheme that uses a discontinuous transmission (DTX) pattern, then the characteristics of the plurality of UTWs may be determined based on the DTX pattern.

At 742, the UE 110 identifies a plurality of PRS measurement occasions (PMOs). Each PMO of the plurality of PMOs may correspond to the positioning occasion described above, as specified in the OTDOA assistance data. Once the identifying at 740 and the identifying at 742 have been performed, the transceiver selection algorithm 700 proceeds to 750.

At 740 and 742, there may be any number of identified pluralities. For example, the transceiver selection algorithm 700 may identify all UTWs and PMOs within a predetermined span of time (for example, twelve hundred and eighty subframes or any other suitable span), or a span of time corresponding to an arbitrary number of PMOs (for example, four PMOs or any other suitable number).

At 750, the UE 110 compares the plurality of UTWs identified at 740 with the plurality of PMOs identified at 742. The comparison can further include determining, for each of the plurality of periodic PMOs, whether there is overlap with any of the plurality of uplink transmission windows UTWs. If there is at least one such overlap, then the at least one non-overlapping PRS measurement occasion that does not overlap with any of the plurality of uplink transmission windows can be identified. In one implementation, this determining can comprise aspects described with reference to block 760.

At 760, the UE 110 determines if there is a PMO in the plurality of PMOs that does not overlap with any of the plurality of UTWs. As used in the context of FIG. 7, "overlap" may refer to complete overlap and/or partial overlap, as may be selected during the implementation process. If there are no non-overlapping PMOs ('no' at 760), then the transceiver selection algorithm 700 proceeds to 770. If there is at least one non-overlapping PMO ('yes' at 760), then the transceiver selection algorithm 700 proceeds to 782.

In some implementations, it may be necessary to identify more than one non-overlapping PMO. For example, if the PRS measurement can not be performed within a single PMO, then the transceiver selection algorithm 700 may determine how many PMOs will be necessary to perform the PRS measurement. Moreover, the transceiver selection algorithm 700 may proceed to 782 only if the number of non-overlapping PMOs is greater than or equal to the number of PMOs necessary to perform the PRS measurement. For example, if two PMOs are necessary to perform the PRS measurement, then the determining at 760 may be a determination as to whether there are two or more non-overlapping PMOs. If there are fewer than two non-overlapping PMOs, then the transceiver selection algorithm 700 may proceed to 770, and if there are two or more non-overlapping PMOs, then the transceiver selection algorithm 700 proceeds to 782.

The PMOs may be periodic with a period of, for example, one-hundred and sixty subframes, three-hundred and twenty subframes, etc. The UTWs may or may not be periodic and may or may not vary from one UTW to another. Accordingly, even if the first identified PMO overlaps with one of the identified UTWs, there is a possibility that the second identified PMO does not overlap with any of the identified UTWs.

At 770, the UE 110 selects the primary aggressor transceiver (identified at 730) for performing the PRS measurement. The selecting at 770 may be analogous to the selecting at 470, as depicted in FIG. 4. At 774, the UE 110 tunes the selected transceiver to the target band and performs the instructed PRS measurement during the next PMO.

At 782, the UE 110 selects a transceiver based on other considerations. The selecting at 782 may be analogous to the selecting at 474, as depicted in FIG. 4. For example, at 782, a transceiver may be selected based on one or more of a plurality of factors, including a group delay associated with the selected transceiver, a time of arrival associated with the selected transceiver, and/or a sensitivity of the selected transceiver. At 784, the UE 110 tunes the selected transceiver to the target band and performs the instructed PRS measurement during the next non-overlapping PMO, as identified at 760. Means for performing the functionalities of blocks 740, 742, 750, 760, 770, and/or 782 can, but not necessarily, include, for example, memory 320, and/or processing system 310 with reference to FIG. 3. Means for performing the functionalities of blocks 774 and 784 can, but not necessarily, include, for example, transceivers 331, 332, 333, memory 320, and/or processing system 310 with reference to FIG. 3.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on".

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not imply that there are only two elements and further does not imply that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for improving Positioning Reference Signal (PRS) measurements, comprising:
    receiving an instruction at a user equipment (UE) to perform a PRS measurement on a target band, wherein the PRS measurement is an inter-frequency PRS measurement associated with a PRS measurement occasion;
    estimating, for each transceiver of a plurality of transceivers associated with the UE, and based on one or more transmit frequency bands thereof, interference with the inter-frequency PRS measurement;
    identifying a primary aggressor transceiver from among the plurality of transceivers, wherein the primary aggressor transceiver has a highest estimated interference;
    identifying an uplink transmission window associated with the primary aggressor transceiver;
    comparing the uplink transmission window to the PRS measurement occasion;
    selecting the identified primary aggressor transceiver as a selected transceiver in response to a determination that there is complete overlap between the uplink transmission window and the PRS measurement occasion;
    tuning the selected transceiver to the target band; and
    performing the inter-frequency PRS measurement with the selected transceiver.

2. The method of claim 1, wherein the estimating of the interference is based on interference estimate data points in an aggressor-victim data set, the aggressor-victim data set comprising a first dimension representing one or more target bands and a second dimension representing one or more potential aggressor bands (PABs), wherein the aggressor-victim data set includes an interference estimate data point for each band pairing of a target band and a PAB.

3. The method of claim 2, wherein the estimating of the interference comprises:
    identifying the PAB to which the each transceiver of the plurality of transceivers is tuned;
    identifying the target band associated with the received instruction; and
    retrieving, from the aggressor-victim data set, an interference estimate data point value corresponding to a band pairing of the identified PAB and the identified target band.

4. The method of claim 3, wherein the estimating of the interference further comprises, for the each transceiver of the plurality of transceivers:
    determining an uplink transmission power associated with uplink transmissions on the identified PAB; and
    calculating an interference estimate based on the retrieved interference estimate data point value and the determined uplink transmission power.

5. The method of claim 1, further comprising:
    selecting a transceiver that is different from the primary aggressor transceiver as the selected transceiver in response to a determination that the uplink transmission window does not overlap with the PRS measurement occasion.

6. The method of claim 1, further comprising, in response to a determination that there is partial overlap between the uplink transmission window and the PRS measurement occasion:
    identifying a non-overlapping part of the PRS measurement occasion, wherein the non-overlapping part does not overlap with the uplink transmission window; and
    determining whether the PRS measurement can be performed during the non-overlapping part of the PRS measurement occasion.

7. The method of claim 6, further comprising:
    in response to a determination that the PRS measurement can not be performed during the non-overlapping part of the PRS measurement occasion, selecting the primary aggressor transceiver; and in response to a determination that the PRS measurement can be performed during the non-overlapping part of the PRS measurement occasion, selecting the transceiver based on one or more of a plurality of factors, including:
a group delay associated with the selected transceiver;
a time of arrival associated with selected transceiver;
a sensitivity of the selected transceiver.

8. The method of claim 1, wherein:
the PRS measurement occasion is one of a plurality of periodic PRS measurement occasions and the uplink transmission window is one of a plurality of uplink transmission windows;
comparing the uplink transmission window to the PRS measurement occasion comprises:
determining, for each of the plurality of periodic PRS measurement occasions, whether there is overlap with any of the plurality of uplink transmission windows; and
identifying at least one non-overlapping PRS measurement occasion that does not overlap with any of the plurality of uplink transmission windows.

9. The method of claim 8, further comprising:
in response to a determination that the PRS measurement can not be performed during the at least one non-overlapping PRS measurement occasion, selecting the primary aggressor transceiver; and/or
in response to a determination that the PRS measurement can be performed during the at least one non-overlapping PRS measurement occasion, selecting the transceiver based on one or more of a plurality of factors, including:
a group delay associated with the selected transceiver;
a time of arrival associated with selected transceiver;
a sensitivity of the selected transceiver.

10. The method of claim 1, wherein identifying the uplink transmission window associated with the primary aggressor transceiver comprises:
determining whether the primary aggressor transceiver is operating in accordance with a time-division duplexing scheme or a frequency-division duplexing scheme;
identifying the uplink transmission window based on an uplink schedule if the primary aggressor transceiver is operating in accordance with a time-division duplexing scheme; and
identifying the uplink transmission window based on a transmitting part of a discontinuous transmission pattern if the primary aggressor transceiver is operating in accordance with a frequency-division duplexing scheme that uses the discontinuous transmission pattern.

11. A user equipment (UE), comprising:
a plurality of transceivers, wherein:
at least one of the plurality of transceivers is configured to receive an instruction to perform a Positioning Reference Signal (PRS) measurement on a target band, wherein the PRS measurement is an inter-frequency PRS measurement associated with a PRS measurement occasion; and
a selected transceiver of the plurality of transceivers is configured to perform an inter-frequency PRS measurement;
memory configured to store data, instructions, or a combination thereof; and
a processing system, coupled to the memory and the plurality of transceivers, that is configured to:
estimate, for each transceiver of a plurality of transceivers associated with the UE, and based on one or more transmit frequency bands thereof, an interference with the inter-frequency PRS measurement;
identify a primary aggressor transceiver from among the plurality of transceivers, wherein the primary aggressor transceiver has a highest estimated interference;
identify an uplink transmission window associated with the primary aggressor transceiver;
compare the uplink transmission window to the PRS measurement occasion;
select the identified primary aggressor transceiver as the selected transceiver in response to a determination that there is complete overlap between the uplink transmission window and the PRS measurement occasion; and
tune the selected transceiver to the target band.

12. The UE of claim 11, wherein:
the memory is further configured to store an aggressor-victim data set comprising a first dimension representing one or more target bands and a second dimension representing one or more potential aggressor bands (PABs), wherein the aggressor-victim data set includes an interference estimate data point for each band pairing of a target band and a PAB; and
the processing system is further configured to estimate the interference based on the interference estimate data points in the aggressor-victim data set.

13. The UE of claim 12, wherein to estimate the interference, the processing system is, for each transceiver of the plurality of transceivers, further configured to:
identify the PAB to which the each transceiver of the plurality of transceivers is tuned;
identify the target band associated with the received instruction; and
retrieve, from the aggressor-victim data set, an interference estimate data point value corresponding to a band pairing of the identified PAB and the identified target band.

14. The UE of claim 13, wherein to estimate the interference, the processing system is, for each transceiver of the plurality of transceivers, further configured to:
determine an uplink transmission power associated with uplink transmissions on the identified PAB; and
calculate an interference estimate based on the retrieved interference estimate data point value and the determined uplink transmission power.

15. The UE of claim 11, wherein the processing system is further configured to:
select a transceiver that is different from the primary aggressor transceiver as the selected transceiver in response to a determination that the uplink transmission window does not overlap with the PRS measurement occasion.

16. The UE of claim 11, wherein the processing system is further configured to, in response to a determination that there is partial overlap between the uplink transmission window and the PRS measurement occasion:
identify a non-overlapping part of the PRS measurement occasion, wherein the non-overlapping part does not overlap with the uplink transmission window; and
determine whether the PRS measurement can be performed during the non-overlapping part of the PRS measurement occasion.

17. The UE of claim 16, wherein the processing system is further configured to:

select the primary aggressor transceiver in response to a determination that the PRS measurement can not be performed during the non-overlapping part of the PRS measurement occasion; and select, in response to a determination that the PRS measurement can be performed during the non-overlapping part of the PRS measurement occasion, the transceiver based on one or more of a plurality of factors, including:
  a group delay associated with the selected transceiver;
  a time of arrival associated with selected transceiver;
  a sensitivity of the selected transceiver.

18. The UE of claim 11, wherein the PRS measurement occasion is one of a plurality of periodic PRS measurement occasions and the uplink transmission window is one of a plurality of uplink transmission windows; and
  the processing system is further configured to:
    compare the uplink transmission window to the PRS measurement occasion comprises:
    determine, for each of the plurality of periodic PRS measurement occasions, whether there is overlap with any of the plurality of uplink transmission windows; and
    identify at least one non-overlapping PRS measurement occasion that does not overlap with any of the plurality of uplink transmission windows.

19. The UE of claim 18, the processing system is further configured to:
  select the primary aggressor transceiver in response to a determination that the PRS measurement can not be performed during the at least one non-overlapping PRS measurement occasion; and/or
  select, in response to a determination that the PRS measurement can be performed during the at least one non-overlapping PRS measurement occasion, the transceiver based on one or more of a plurality of factors, including:
    a group delay associated with the selected transceiver;
    a time of arrival associated with selected transceiver;
    a sensitivity of the selected transceiver.

20. The UE of claim 11, wherein to identify the uplink transmission window associated with the primary aggressor transceiver, the processing system is further configured to:
  determine whether the primary aggressor transceiver is operating in accordance with a time-division duplexing scheme or a frequency-division duplexing scheme;
  identify the uplink transmission window based on an uplink schedule if the primary aggressor transceiver is operating in accordance with a time-division duplexing scheme; and
  identify the uplink transmission window based on a transmitting part of a discontinuous transmission pattern if the primary aggressor transceiver is operating in accordance with a frequency-division duplexing scheme that uses the discontinuous transmission pattern.

21. An apparatus, comprising:
  means for receiving an instruction to perform a Positioning Reference Signal (PRS) measurement on a target band, wherein the PRS measurement is an inter-frequency PRS measurement associated with a PRS measurement occasion;
  means for estimating, for each transceiver of a plurality of transceivers associated with a UE, and based on one or more transmit frequency bands thereof, an interference with the inter-frequency PRS measurement;
  means for identifying a primary aggressor transceiver from among the plurality of transceivers, wherein the primary aggressor transceiver has a highest estimated interference;
  means for identifying an uplink transmission window associated with the primary aggressor transceiver;
  means for comparing the uplink transmission window to the PRS measurement occasion;
  means for selecting the identified primary aggressor transceiver as a selected transceiver in response to a determination that there is complete overlap between the uplink transmission window and the PRS measurement occasion;
  means for tuning the selected transceiver to the target band; and
  means for performing the inter-frequency PRS measurement with the selected transceiver.

22. The apparatus of claim 21, further comprising:
  means for storing an aggressor-victim data set comprising a first dimension representing one or more target bands and a second dimension representing one or more potential aggressor bands (PABs), wherein the aggressor-victim data set includes an interference estimate data point for each band pairing of a target band and a PAB; and
  means for estimating the interference based on the interference estimate data points in the aggressor-victim data set.

23. The apparatus of claim 21, further comprising:
  means for selecting a transceiver that is different from the primary aggressor transceiver as the selected transceiver in response to a determination that the uplink transmission window does not overlap with the PRS measurement occasion.

24. The apparatus of claim 21, further comprising:
  means for identifying a non-overlapping part of the PRS measurement occasion, wherein the non-overlapping part does not overlap with the uplink transmission window, in response to a determination that there is partial overlap between the uplink transmission window and the PRS measurement occasion:
  means for determining whether the PRS measurement can be performed during the non-overlapping part of the PRS measurement occasion.

25. The apparatus of claim 21, wherein:
  the PRS measurement occasion is one of a plurality of periodic PRS measurement occasions and the uplink transmission window is one of a plurality of uplink transmission windows; and
  the means for comparing the uplink transmission window to the PRS measurement occasion comprises:
    means for determining, for each of the plurality of periodic PRS measurement occasions, whether there is overlap with any of the plurality of uplink transmission windows; and
    means for identifying at least one non-overlapping PRS measurement occasion that does not overlap with any of the plurality of uplink transmission windows.

26. A non-transitory computer-readable medium comprising at least one instruction for a processor to perform operations, the operations comprising:
  processing the reception of an instruction to perform a Positioning Reference Signal (PRS) measurement on a target band, wherein the PRS measurement is an inter-frequency PRS measurement associated with a PRS measurement occasion;

estimating, for each transceiver of a plurality of transceivers associated with a UE, and based on one or more transmit frequency bands thereof, an interference with the inter-frequency PRS measurement;

identifying a primary aggressor transceiver from among the plurality of transceivers, wherein the primary aggressor transceiver has a highest estimated interference;

identifying an uplink transmission window associated with the primary aggressor transceiver;

comparing the uplink transmission window to the PRS measurement occasion;

selecting the identified primary aggressor transceiver as a selected transceiver in response to a determination that there is complete overlap between the uplink transmission window and the PRS measurement occasion;

controlling the tuning of the selected transceiver to the target band; and performing the inter-frequency PRS measurement with the selected transceiver.

27. The non-transitory computer-readable medium of claim 26, the operations further comprising:

storing an aggressor-victim data set comprising a first dimension representing one or more target bands and a second dimension representing one or more potential aggressor bands (PABs), wherein the aggressor-victim data set includes an interference estimate data point for each band pairing of a target band and a PAB; and estimating the interference based on the interference estimate data points in the aggressor-victim data set.

28. The non-transitory computer-readable medium of claim 26, the operations further comprising:

selecting a transceiver that is different from the primary aggressor transceiver as the selected transceiver in response to a determination that the uplink transmission window does not overlap with the PRS measurement occasion.

29. The non-transitory computer-readable medium of claim 26, the operations further comprising:

identifying a non-overlapping part of the PRS measurement occasion, wherein the non-overlapping part does not overlap with the uplink transmission window, in response to a determination that there is partial overlap between the uplink transmission window and the PRS measurement occasion:

determining whether the PRS measurement can be performed during the non-overlapping part of the PRS measurement occasion.

30. The non-transitory computer-readable medium of claim 26, wherein:

the PRS measurement occasion is one of a plurality of periodic PRS measurement occasions and the uplink transmission window is one of a plurality of uplink transmission windows; and the comparing the uplink transmission window to the PRS measurement occasion comprises:

determining, for each of the plurality of periodic PRS measurement occasions, whether there is overlap with any of the plurality of uplink transmission windows; and identifying at least one non-overlapping PRS measurement occasion that does not overlap with any of the plurality of uplink transmission windows.

* * * * *